United States Patent [19]

Mosher et al.

[11] 4,023,545
[45] May 17, 1977

[54] ENERGY MEANS FOR INTERNAL COMBUSTION ENGINES

[76] Inventors: Edward G. Mosher, 2462 Transit Ave., Anaheim, Calif. 92804; John T. Webster, 2436 Greenleaf Ave., Anaheim, Calif. 92801

[22] Filed: Jan. 24, 1975

[21] Appl. No.: 543,667

[52] U.S. Cl. .............................. 123/119 E; 123/3; 123/DIG. 12; 204/129
[51] Int. Cl.² ........................................ F02M 27/00
[58] Field of Search ............... 123/DIG. 12, 119 E, 123/3; 204/129, 278, 293

[56] References Cited
UNITED STATES PATENTS

| | | | |
|---|---|---|---|
| 1,876,879 | 9/1932 | Drabold | 123/DIG. 12 |
| 2,384,463 | 9/1945 | Gunn et al. | 123/DIG. 12 |
| 2,509,498 | 5/1950 | Heyl | 123/DIG. 12 |
| 2,588,450 | 3/1952 | Zadra | 204/293 |
| 3,074,390 | 1/1963 | O'Laughlin | 123/DIG. 12 |
| 3,311,097 | 3/1967 | Mittelstaedt | 123/DIG. 12 |
| 3,459,953 | 8/1969 | Hughes et al. | 204/129 |
| 3,829,367 | 8/1974 | Raviv | 204/129 |

FOREIGN PATENTS OR APPLICATIONS 1,213,641  4/1960  France ........................ 123/DIG. 12

Primary Examiner—Wendell E. Burns
Assistant Examiner—David D. Reynolds
Attorney, Agent, or Firm—Limbach, Limbach & Sutton

[57] ABSTRACT

A gas generating system for use with internal combustion engines, to afford hydrogen gas and oxygen gas to be intermixed with the fuel for the engine.

It comprises an electrolysis unit which is energized by the existing electrical system normally associated with an internal combustion engine, such unit utilizing distilled water and Sodium Hydroxide as the electrolyte. The system further includes means for conducting ambient air into the electrolysis unit for agitating or mixing the electrolyte and removing the gases that accumulate on the anode and cathode. The unit comprises a stainless steel tank as well as stainless steel anode and cathode members.

4 Claims, 5 Drawing Figures

ENERGY MEANS FOR INTERNAL COMBUSTION ENGINES

The present invention relates generally to auxiliary systems for internal combustion engines, and more particularly to systems for enhancing combustion of the fuels utilized therein.

Petroleum products of various types and descriptions have been used extensively within the past years, so that today such products are in somewhat short supply and hence are relatively expensive. Due to modern-day technology, the demand for petroleum products by the transportation industries as well as the plastics and other synthetic materials industries has resulted in an acute shortage of fuel for use in internal combustion engines.

It has been realized for some period of time, that it would be desirable to have an internal combustion engine which exhibits greater efficiency in using its petroleum base fuel so as to help decrease the demand for such materials.

Also, within the past several decades, the atmosphere has become polluted with the gaseous residue from inefficient burning of petroleum base fuel in internal combustion engines. Accordingly, it has been further realized that such polluting emissions from the operation of internal combustion engines could be reduced as a result of more efficient burning of the fuel so that little or no residue would be emitted into the atmosphere.

Accordingly, it is an object of the present invention to provide an auxiliary system for internal combustion engines which causes more efficient burning of the fuel to afford increased power and decreased polluting emissions.

Another object of the present invention is to provide a system for internal combustion engines as characterized above which employs an electrolysis unit for adding both oxygen and hydrogen gases to the fuel-air mixture of the engine.

A still further object of the present invention is to provide a system for internal combustion engines as characterized above which utilizes the electrical energy source normally associated with internal combustion engines for operating the electrolysis unit.

An even further object of the present invention is to provide a system for internal combustion engines as characterized above wherein distilled water is broken down into its constituent ingredients, hydrogen gas and oxygen gas, to be fed into the intake manifold of the internal combustion engine.

Another further object of the present invention is to provide a system for internal combustion engines as characterized above wherein such distilled water is automatically fed to the electrolysis unit, under the force of atmospheric pressure.

A further object of the present invention is to provide a system for internal combustion engines as characterized above which is simple and inexpensive to manufacture, and which is rugged and dependable in operation.

The novel features which we consider characteristic of our invention are set forth with particularity in the appended claims. The invention itself, however, both as to its organization and mode of operation, together with additional objects and advantages thereof, will best be understood from the following description of specific embodiments when read in connection with the accompanying drawings, in which:

Like reference characters indicate corresponding parts throughout the several view of the drawings.

Figure 1:
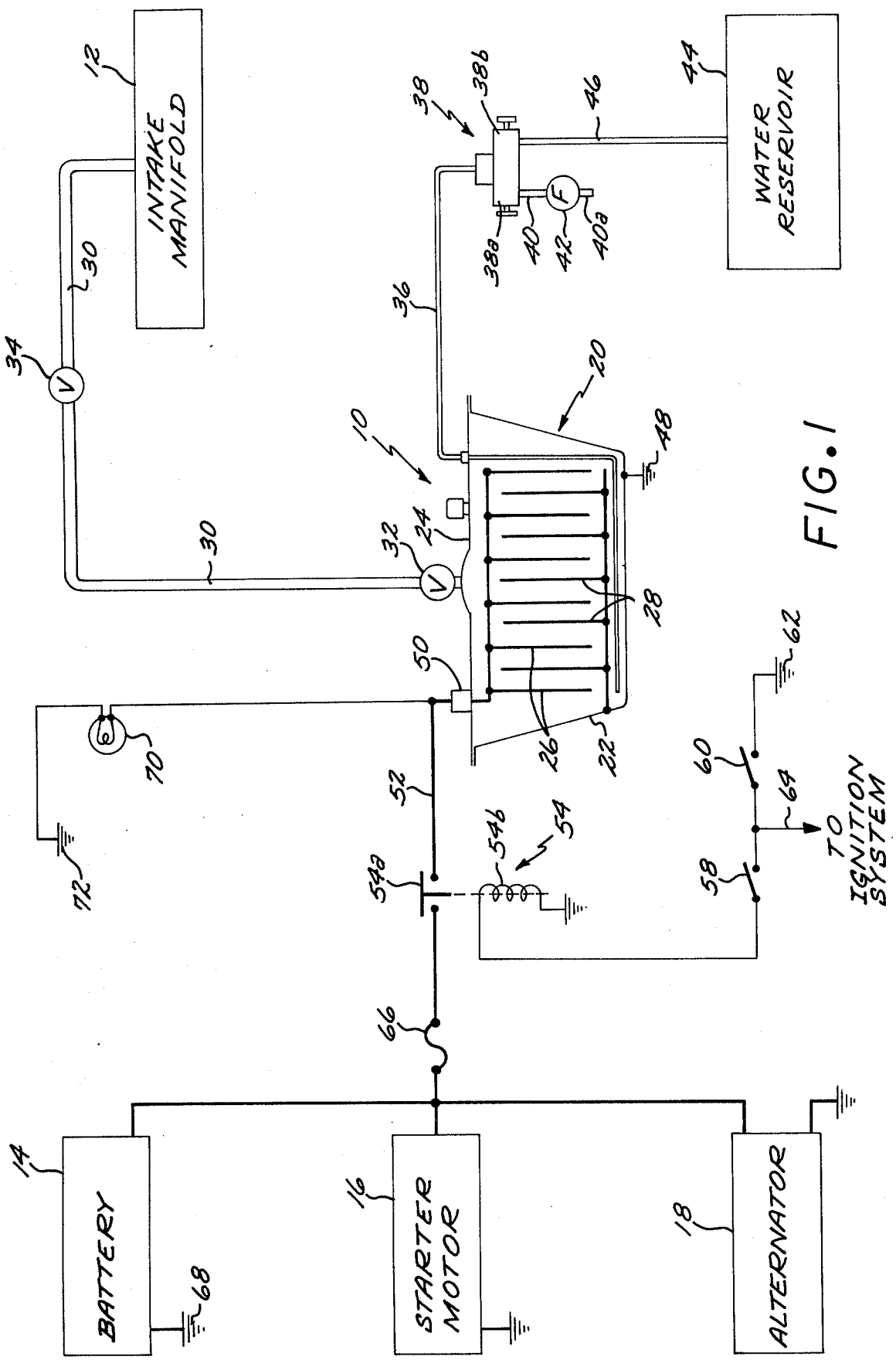
FIG. 1 is a schematic showing of a system according to the present invention.

Referring to FIG. 1 of the drawings, there is shown therein a system 10 in association with an internal combustion engine (not shown in detail), such engine normally comprising an intake manifold 12, a battery 14, a starter 16 and an alternator 18. The manifold 12, as is common practice with internal combustion engines, is associated with the carburetor (not shown) to provide the desired fuel-air mixture to the combustion chamber of the various cylinders of the engine. Such intake manifold 12 constitutes a chamber through which air is drawn into the engine for intermixing with the fuel to provide the combustible vapor or mixture. Manifold 12, therefore, has an internal pressure less than ambient atmospheric pressure.

Battery 14, starter motor 16, and alternator 18 are employed for starting and maintaining operation of the engine as by turning the crank shaft thereof in starting the engine and affording an electrical potential at the spark plugs (not shown) for creating a spark to ignite the fuel-air mixture.

As shown in FIG. 1, the system 10 comprises an electrolysis unit 20 which comprises a tank 22 and cover 24 therefor and wherein is positioned in spaced relation, a plurality of anodes 26 and cathodes 28.

A conduit 30 connects the interior of tank 22 to the manifold 12, there being a first flow-control valve 32 and a safety or unidirectional valve 34 in such conduit.

Pipe means 36 is provided for bringing air into the tank 22. Such pipe means is connected to a double valve 38 having a first valve section 38a and a second valve section 38b. Section 38a is connected to an air intake pipe 40 having air filter means 42 therein. The end 40a of pipe 40 is exposed to ambient atmospheric pressure for purposes which hereinafer will be explained.

Section 38b of valve 38 is connected to a water reservoir 44 by means of a conduit 46.

Each of valve sections 38a and 38b is independently manually adjustable for controlling the flow of fluid through pipe means 36.

As further shown in FIG. 1 of the drawings, the tank 22 is grounded as at 48, and an insulated terminal-mounting member 50 mounted in cover 24 is connected to a lead wire 52.

A solenoid-operated relay 54 having an electro-responsive contactor 54a is operatively mounted in the lead wire 52. Such relay includes a solenoid winding 54b, one end of which is grounded as at 56. The other end of winding 54b is connected through a pair of serially arranged electrical switches 58 and 60 to ground as at 62. As indicated in FIG. 1, a lead wire 64 connects such circuit to the ignition system of the internal combustion engine.

A fuse 66 is also operatively positioned in the lead wire 52, the latter of which is connected to the positive terminal of battery 14, the negative terminal thereof being grounded as at 68.

An indicator lamp 70 is connected between terminal 50 and the ground as at 72.

Figure 3:
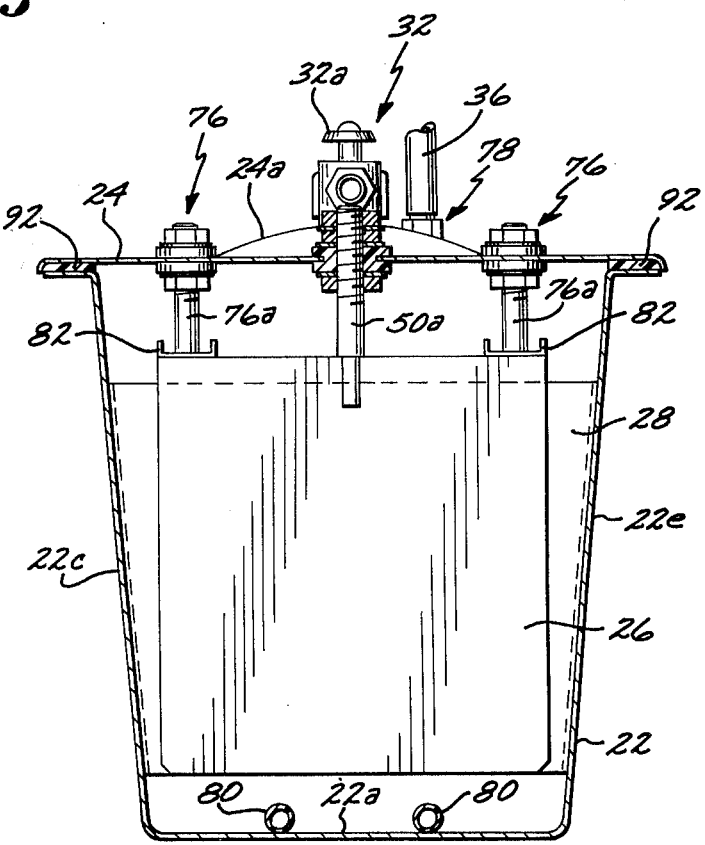
FIG. 3 is a transverse sectional view, taken substantially along line 3—3 of FIG. 2.
Figure 4:
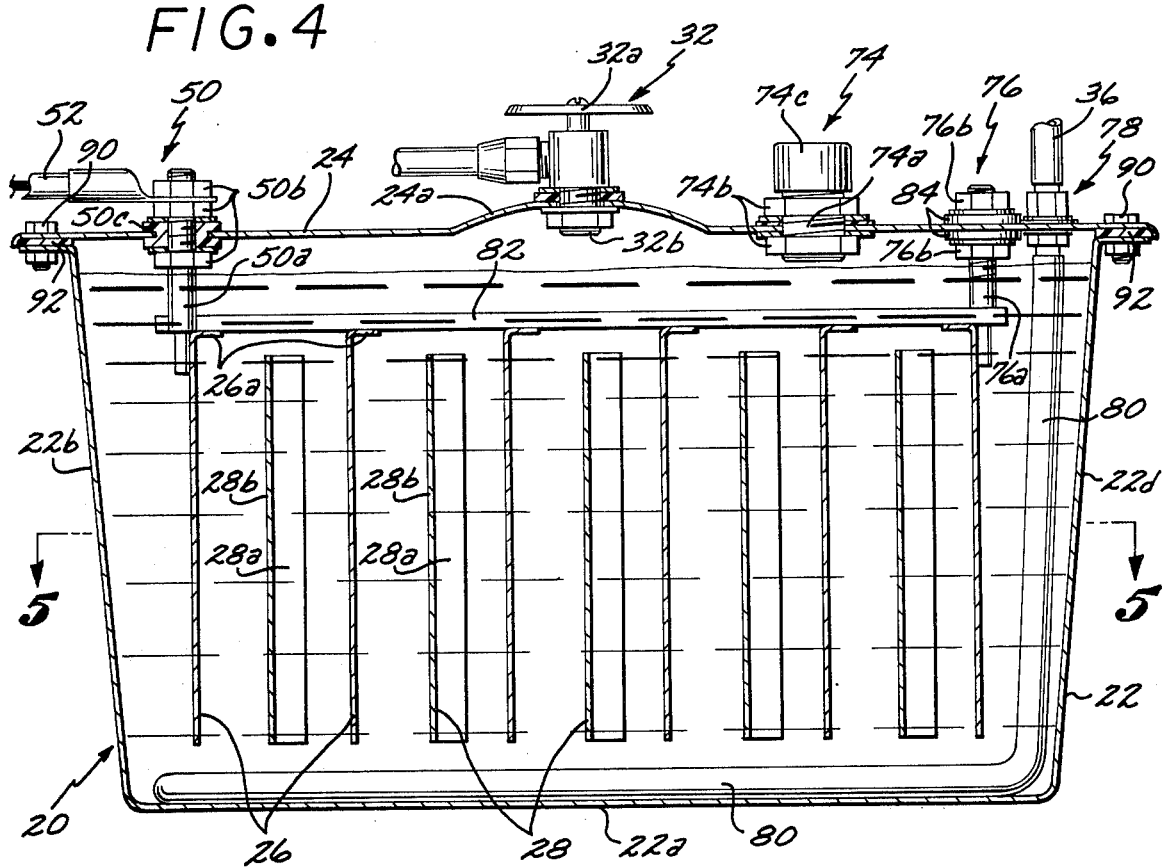
FIG. 4 is a longitudinal sectional view of the electrolysis unit, taken substantially along line 4—4 of FIG. 2.

Referring to FIG. 4 of the drawings, the electrolysis unit 20 comprises a tank 22 having a bottom wall 22a and four side walls 22b, 22c, 22d, and 22e. The upper edge of each of such side walls is formed with a flange as shown most clearly in FIGS. 3 and 4 of the drawings. Tank 22 is formed of stainless steel whose composition is substantially identical with the composition of the stainless steel cover 24.

The cover is relatively flat and is provided with through openings to accomodate valve 32, terminal-mounting member 50, fluid inlet means 74 and mounting members 76.

Valve 32 is manually adjustable by means of handle 32a, and includes pipe means 32b exposed to the interior of tank 22. Such valve is sealingly mounted within an opening in cover 24, at the apex of a dome-shaped protuberance 24a formed in the latter.

Inlet means 74 comprises a pipe nipple 74a which is insulatedly and hermetically mounted within the opening in cover 24 by suitable fastening nuts 74b. A cap 74c is mounted on pipe nipple 74a to prevent the escape of gases from within tank 22, while being removable to permit additional electrolyte to be added to the unit.

As further shown in FIG. 4, the pipe means 36 is connected to a pipe fitting 78 to afford communication to a tube 80 within the tank. Such tube, as shown most clearly in FIG. 5 of the drawings, is placed on the bottom wall 22a of tank 22 and is formed with a plurality of openings or holes 80a through which air is dispersed into the tank, as will hereinafter be explained. A plug 80b is provided in the end of tube 80 to insure proper dispersement of the air within the tank.

Figure 5:
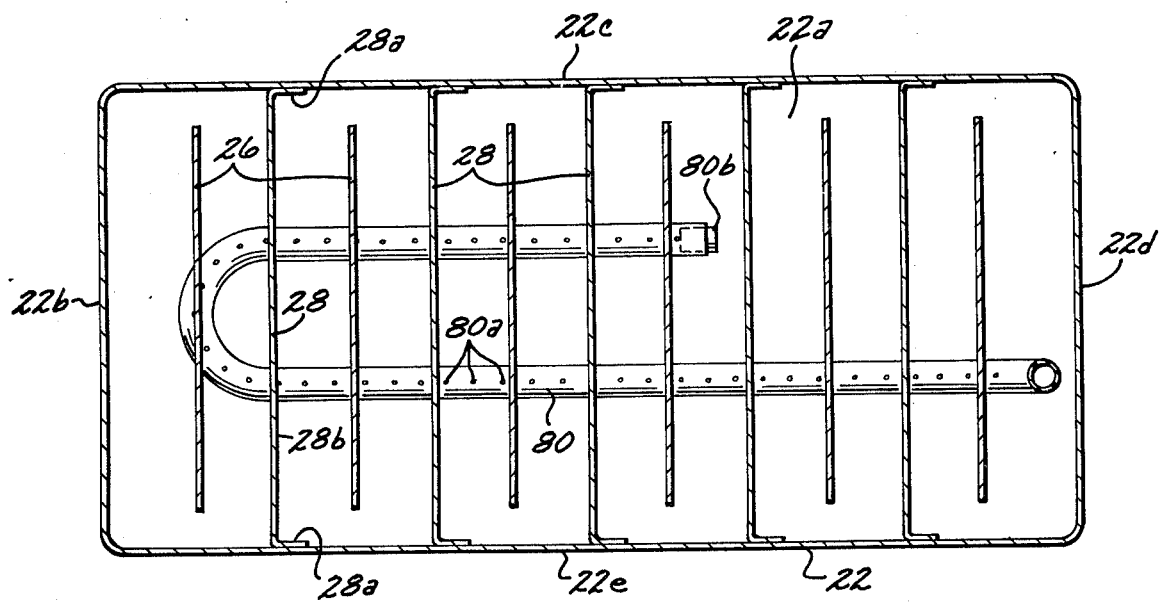
FIG. 5 is another sectional view of the unit, taken substantially along line 5—5 of FIG. 4.

Mounted within the tank 22 and between the opposite side walls 22e thereof is a plurality of relatively square, flat cathodes 28. Each such cathode has its opposite marginal edges 28a bent at right angles to the main portion 28b thereof to fit along the respective side walls as shown in FIGS. 3, 4 and 5 of the drawings. Each such cathode is formed of the same stainless steel as tank 22 and the aforementioned anodes 26, and is secured as by welding or the like to the side walls of the tank in the positions shown in the drawings.

Positioned between the cathodes 28 are the anodes 26. A pair of support members 82 which also constitute electrical bus bars are provided within the tank 22 and, as shown most clearly in FIG. 3 of the drawings, may have a generally U-shape cross section. The upper marginal edge of each of the relatively square, flat anodes 26 is bent or off-set, as shown at 26a, affording a tab 26a which is welded to the spaced support members 82. Thus, there is provided a subassembly comprising the several support members 82 and a plurality of depending anodes 26. Such subassembly is supported within the tank 22 by terminal-mounting member 50 and the mounting members 76.

Figure 2:
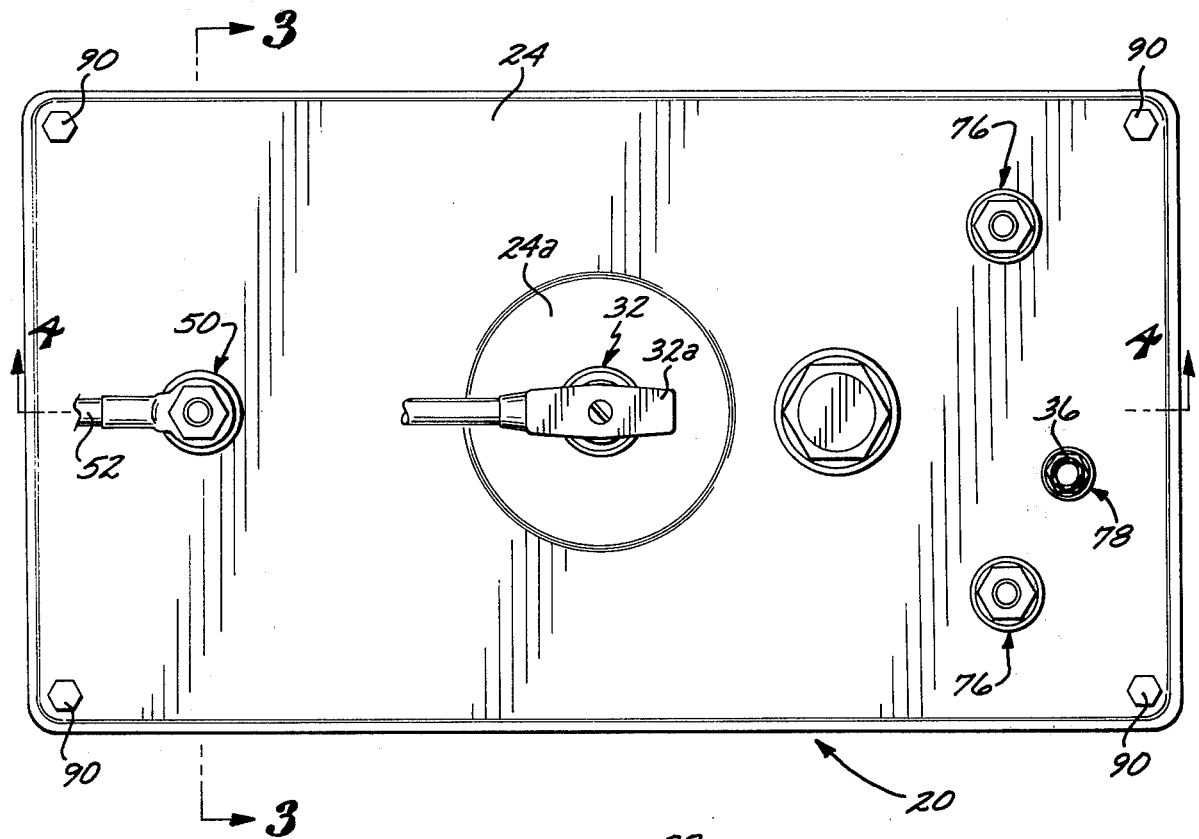
FIG. 2 is a top plan view of the electrolysis unit of the subject system.

Each of the members 76 comprises a stud 76a which is welded to one of the anodes 26, as shown most clearly in FIG. 4 of the drawings. Each stub 76a is threaded and is provided with a pair of fastening nuts 76b and suitable sealing washers 84 for securing each member 76 within the cover 24. As shown most clearly in FIGS. 2 and 3 of the drawings, there are a pair of mounting members 76.

The terminal-mounting member 50 comprises a stud 50a which is welded to one of the anodes 26. Fastening nuts 50b and sealing means 50c enable the terminal-mounting member 50 to be firmly mounted within the cover 24. This arrangement causes the anodes 26 to be properly suspended between the various cathodes and away from the tank 22, the terminal-mounting member 50 and support members 82 affording means for conducting electrical current to the anodes.

The cover 24 is firmly secured to tank 22 along the aforementioned flange. Suitable stainless steel bolts 90 are employed for this purpose, and a sealing gasket 92 is interposed between the cover and tank to prevent ingress of the air to the interior of tank 22.

To operate the subject system 10, it is necessary for the engine (not shown) to be operating. This is accomplished by the use of switch 60 which completes the electrical circuit to the ignition system of the engine through lead wire 64. Thereafter, closure of electrical switch 58 causes winding 54b of solenoid 54 to be energized thus moving contactor 54a into its closed circuit position. This causes electrical energy to flow from the existing electrical system through fuse 66 and lead wire 52 to the terminal 50 of electrolysis unit 20. Current then flows through support member 82 to the various anodes and thence through the electrolyte within tank 22 to the various cathodes 28. Such current flow returns to the electrical system through tank 22 and ground 48.

Current flow through the electrolyte breaks down the distilled water into gaseous hydrogen and gaseous oxygen. These gases accumulate on the cathodes and anodes.

Due to the decreased internal pressure of manifold 12, the atmospheric pressure causes air to flow into intake pipe 40, through filter 42 and valve section 38a as well as pipe means 36 to the tube 80 within tank 22. Such air is dispersed into the electrolyte through the openings 80a of tube 80, resulting in air bubbles which rise through the electrolyte, contacting the oxygen and hydrogen gases and causing them to be separated from the respective anode and cathode. Also, such passage of air bubbles through the electrolyte causes the Sodium Hydroxide to be constantly and thoroughly intermixed with the distilled water.

The oxygen gas and hydrogen gas thus accumulate within the domed protuberance 24a of cover 24, to be conducted into manifold 12 through valve 32, conduit means 30 and valve 34. Such gases ultimately are mixed with the fuel-air mixture for the internal combustion engine, the oxygen gas causing more complete combustion of the various ingredients of the fuel and the hydrogen gas constituting an additional energy source to be completely burned within the various cylinders of the engine. As aforementioned, the more complete burning of the fuel decreases the amount of pollutants emitted from the engine. The additional energy afforded by the hydrogen gas provides additional output of the engine itself.

The decreased internal pressure of manifold 12 also causes the distilled water of reservoir 44 to be forced through conduit 46 and valve section 38b as well as pipe means 36 to the electrolysis unit 20. By suitable adjustment of valve section 38b, the proper amount of distilled water is slowly metered into the tank 22. On the other hand, should it be desired to add larger amounts of distilled water to the unit, it is a simple matter to remove cap 74c from pipe nipple 74a to enable such distilled water to be poured directly into the tank.

Indicator lamp 70 is energized from the electrical system whenever the contactor 54a is in closed circuit position. This affords a visual indication of operation of the unit.

In the event of an overload condition such that an excessive amount of electrical current is drawn from the electrical system, the fuse 66 will respond to shut down the entire unit.

It is thus seen that the present invention provides a system for internal combustion engines whereby more complete combustion of the fuel takes place and thus cleaner operation of the engine results. Also the subject system provides more efficient operation of the engine by adding additional fuel to be burned.

Although we have shown and described certain specific embodiments of our invention, we are well aware that many modifications thereof are possible.

We claim:

1. Energy means for use with an internal combustion engine having a source of electrical energy and an intake manifold for admitting combustion support means to said engine, comprising in combination.

an electrolysis unit connected in circuit with said source of electrical energy to generate hydrogen gas and oxygen gas, said electrolysis unit comprising a tank having at least one cathode attached to said tank internally thereof, said cathode and said tank being connected to the negative side of said source of electrical energy, and at least one anode placed internally of said tank and spaced from contact with said tank and said cathode and connected to the positive side of said source of electrical energy, said tank being substantially filled with a solution of electrolyte and water, whereby application of said electrical energy to said anode and to said cathode may cause generation of hydrogen gas and oxygen gas from the water;

air conduit means extending into said tank beneath both said anode and said cathode such that bubbles of air from said cathode may float upwardly immediately adjacent said anode and said cathode to assist in removing said generated gases from said anodeand said cathode; and gas conduit means interconnecting said tank and said engine intake manifold to conduct said hydrogen and oxygen gases to said manifold.

2. Energy means according to claim 1 wherein said cathode and said anode are formed of stainless steel.

3. Energy means according to claim 2 wherein said tank is formed of stainless steel.

4. Energy means according to claim 1 further comprising a unidirectional valve in said gas conduit means to prevent fluid flow from said manifold toward said tank.

* * * * *